United States Patent [19]

Adachi

[11] Patent Number: 4,992,734

[45] Date of Patent: Feb. 12, 1991

[54] ROTATION DETECTOR HAVING A HOUSING WITH A PROCESSING CIRCUIT AND A TRANSDUCER ELEMENT HOLDER

[75] Inventor: Tsuneo Adachi, Saitama, Japan

[73] Assignee: Diesel KiKi Co., Ltd., Tokyo, Japan

[21] Appl. No.: 485,887

[22] Filed: Feb. 27, 1990

[30] Foreign Application Priority Data

Mar. 9, 1989 [JP] Japan .............................. 1-27121[U]

[51] Int. Cl.⁵ .......................... G01B 7/14; G01N 27/72; G01R 33/12
[52] U.S. Cl. ............................. 324/207.25; 324/207.20; 324/235; 324/262

[58] Field of Search ................. 324/173, 174, 207.11, 324/207.13, 207.14, 207.15, 207.16, 207.17, 207.18, 207.19, 207.20, 207.21, 207.22, 207.25, 226, 234, 235, 236, 239, 262; 307/116; 338/32 H, 32 R; 361/380, 395, 399

[56] References Cited

FOREIGN PATENT DOCUMENTS 60-82918 5/1985 Japan .............................. 324/207.21

Primary Examiner—Walter E. Snow
Attorney, Agent, or Firm—Kanesaka & Takeuchi

[57] ABSTRACT

A magnetoelectronic transducer includes a housing; a circuit board (21) provided within the housing and having a processing circuit (51); an element holder (22) provided within the housing and extending perpendicular to and beyond the circuit board; a magnetoelectronic transducer element (24) provided on a front end of the element holder; a power circuit (50) provided on a basic section (22b) of the element holder; and a cable (28) connected to the power circuit.

6 Claims, 4 Drawing Sheets

ROTATION DETECTOR HAVING A HOUSING WITH A PROCESSING CIRCUIT AND A TRANSDUCER ELEMENT HOLDER

BACKGROUND OF THE INVENTION

1. Field of the Invention

The present invention relates to magnetoelectronic transducers for magnetically detecting the number of revolutions or rotary position of a rotary machine part.

2. Description of the Prior Art

Recently, a large number of magnetoelectronic transducers, such as Hall elements and magnetic resistors, are used to detect the number of revolutions or rotary position of a rotary part of an internal combustion engine or compressor. A conventional magnetoelectronic transducer is shown in FIGS. 5–7. A housing 20 is made from a non-magnetic metal or resin so as to have an element housing front section 200 of a small diameter and a circuit housing rear section 210 of a diameter slightly larger than that of the element housing section 200. The element and circuit housing sections 200 and 210 house an element holder printed circuit board 22 and another circuit board 21, respectively.

As best shown in FIG. 6, the element holder 22 has a front section of a reduced width and an enlarged rear section, on either side of which a wiring pattern is printed to provide conductor leads 23. A pair of parallel conductors 23 extends backwardly from the front edge of the element holder 22 on each side to match four terminals 24a of a Hall element 24 which is a magnetoelectronic transducer element. The four conductors 23 are arranged such that no interference problem arises and each have a through hole 25 at its rear end for use in connection. These through holes 25 are spaced in a line which is perpendicular to the longitudinal direction of the element holder 22.

The Hall element 24 is positioned parallel to the front edge 22a of the element holder 22. The terminals 24a of the Hall element 24 are curved such that they follow the printed surfaces of the element holder 22, and the front portion of the element holder 22 is press fitted between the opposed terminals 24a. Each terminal 24a is connected to the corresponding printed conductor 23 with a mass of solder 26 so that the Hall element 24 is secured to the front end 22a of the element holder 22, which is positioned in the same plane as the circuit board 21. Each conductor 23 of the element holder 22 is connected to the circuit board 21 via a pin 27 which is soldered to the through hole 25. A cable 28 is connected to the circuit board 21 for supplying power to the circuit board 21 and the Hall element 24 and carrying various input and output signals. Thus interconnected circuit board 21 and the element holder 22 are positioned within the housing 20. The four ridgelines on the front portion of the element holder 22 abut against the inside surface of the element housing section 200 so that the element holder 22 is held in place and that the front end of the Hall element 24 abuts with the front wall of the housing 20. The conductors 23 are positioned so that they do not contact with the housing 20.

As shown in FIG. 7, the circuit board 21 has a power circuit 50 which consists of a large capacity capacitor 50a, an oscillation preventive capacitor 50b, and a three-terminal regulator 50c and a processing circuit 51 for supplying power from the power supply 50 to the Hall element 24 and converting a signal outputted by the Hall element 24. The power circuit 50 not only converts the 12-V d.c. voltage, which is supplied by a power supply (not shown) via the cable 28, into 5 V d.c. but also prevents its own oscillation. The processing circuit 51 converts a signal from the Hall element 24 and outputs it to a display or other device (not shown) via the cable 28.

The magnetoelectronic transducer, which is supplying power to the Hall element 24, is positioned near the periphery of a sensing disk 30 which is secured to the rotor of an engine or compressor and has alternating n and s magnetic poles on the periphery. The Hall element 24 detects and converts magnetic changes corresponding to the rotation of the sensing disk 30 into an electrical signal, which is inputted to the processing circuit 51. The processing circuit 51 processes the signal and outputs on the cable 28 a signal which indicates the number of revolutions or rotary position of the sensing disk 30.

In the above magnetoelectronic transducer, a single ordinary printed circuit board (element holder 22) is used to hold the Hall element 24 and electrically connect the Hall element 24 to the circuit board 21 so that there are no needs for any additional part or specially molded holder for the manufacture, resulting in the reduced unit manufacturing cost.

However, the above magnetoelectronic transducer has the power circuit 50 and the processing circuit 51 mounted on the same circuit board 21 so that the circuit board 21 inevitably becomes large. In addition, the power circuit 50, more particularly the three-terminal regulator 50c, generates much heat so that it is necessary to space the processing circuit 51 from the power circuit 50 or provide a heat sink, resulting in not only the limited design freedom but also the increased unit size and manufacturing cost.

SUMMARY OF THE INVENTION

Accordingly, it is an object of the invention to provide a reliable, compact magnetoelectronic transducer which is easy to design with respect to the circuit board.

According to the invention there is provided a magnetoelectronic transducer which includes a housing; a circuit board provided within the housing and having a processing circuit for processing various signals; an element holder provided within the housing and having a basic section adjacent to the circuit board and a front end portion extending from the basic section toward a rotary member to be detected; a magnetoelectronic transducer element attached to a front end of the element holder; a cable for carrying power and the various signals to and from the processing circuit; and a power circuit provided on the basic section of the element holder and connected directly to the cable and indirectly to the circuit board via a conductor.

According to the invention, the power circuit is provided on the basic section of an element holder which is separated from a circuit board, on which only a processing circuit is mounted, and connected directly to a cable and indirectly to the circuit board via a conductor so that not only the size of the circuit board is reduced but also the heat generated by the power circuit has little or no influence on the processing circuit.

Other objects, features, and advantages of the invention will be apparent from the following description when taken in conjunction with the accompanying drawings.

DESCRIPTION OF THE PREFERRED EMBODIMENT

Figure 1:
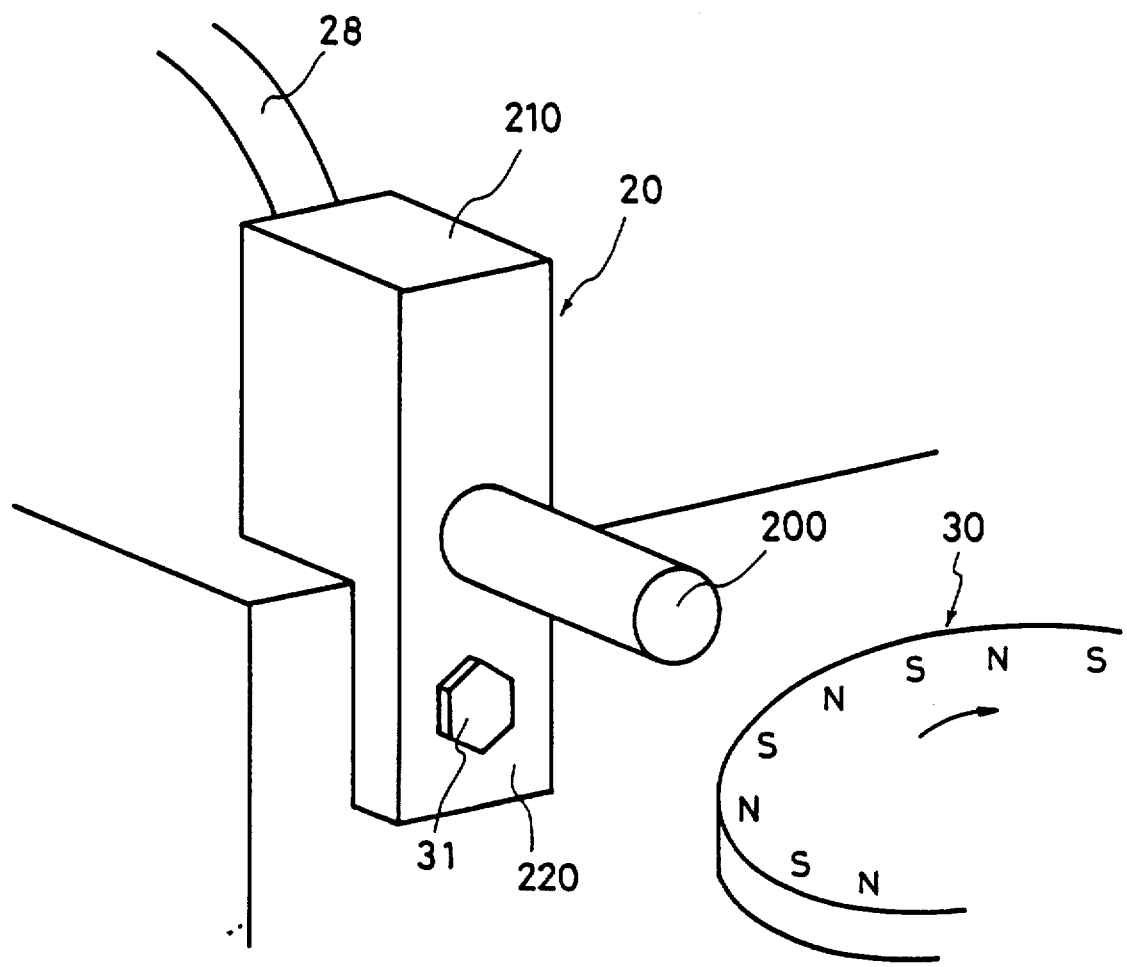
FIG. 1 is a perspective view of a magneto-electronic transducer according to an embodiment of the invention.
Figure 2:
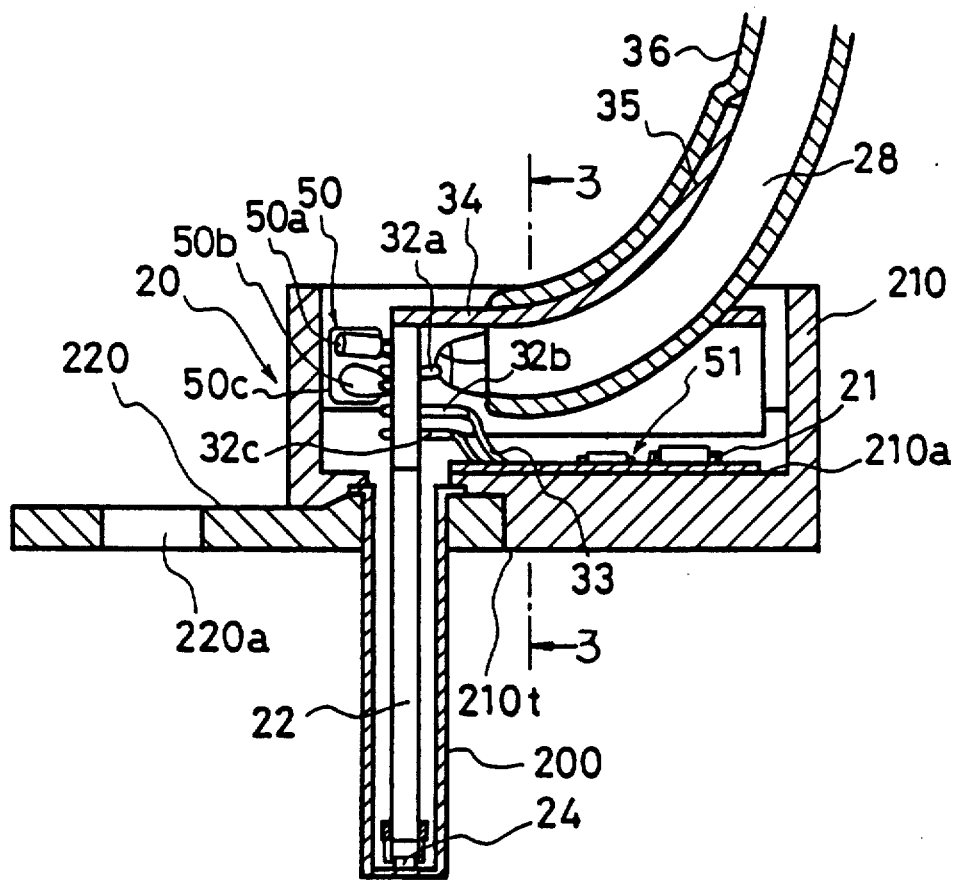
FIG. 2 is a longitudinal section of the magnetoelectronic transducer of FIG. 1.
Figure 3:
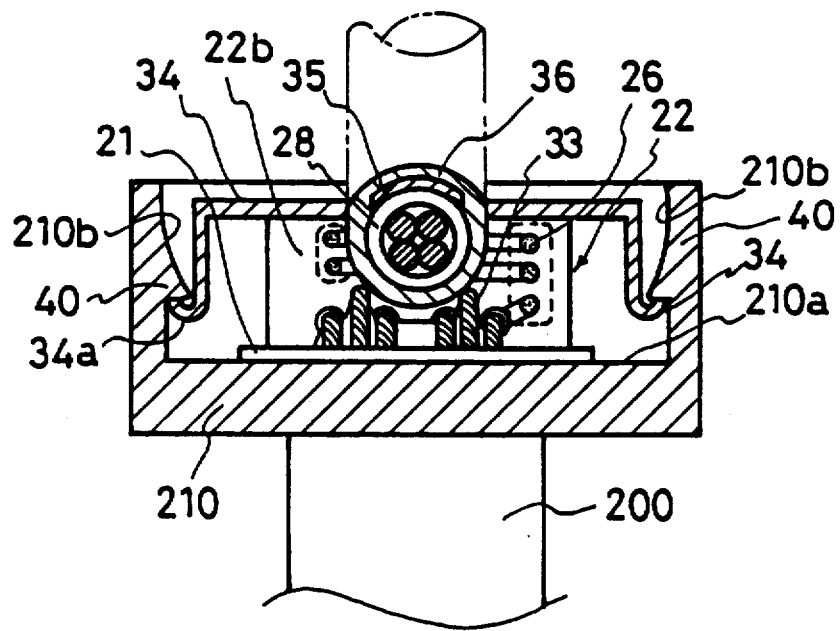
FIG. 3 is a sectional view taken along the line 3—3 of FIG. 2.
Figure 4:
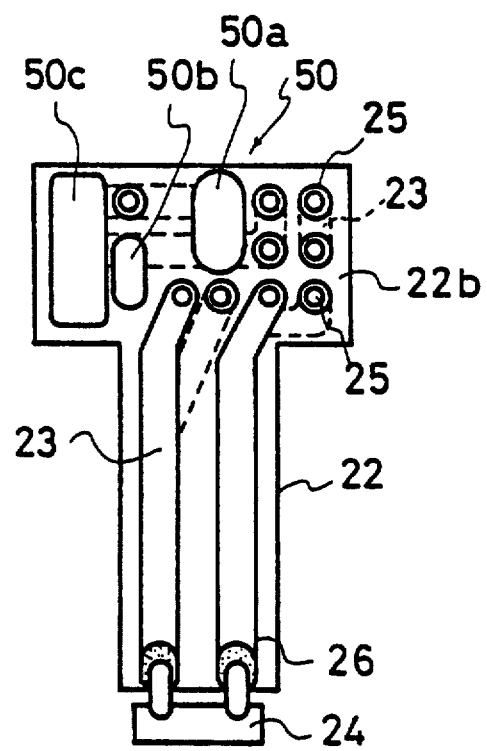
FIG. 4 is a plan view of an element holder useful for the magnetoelectronic transducer of FIG. 1.
Figure 5:
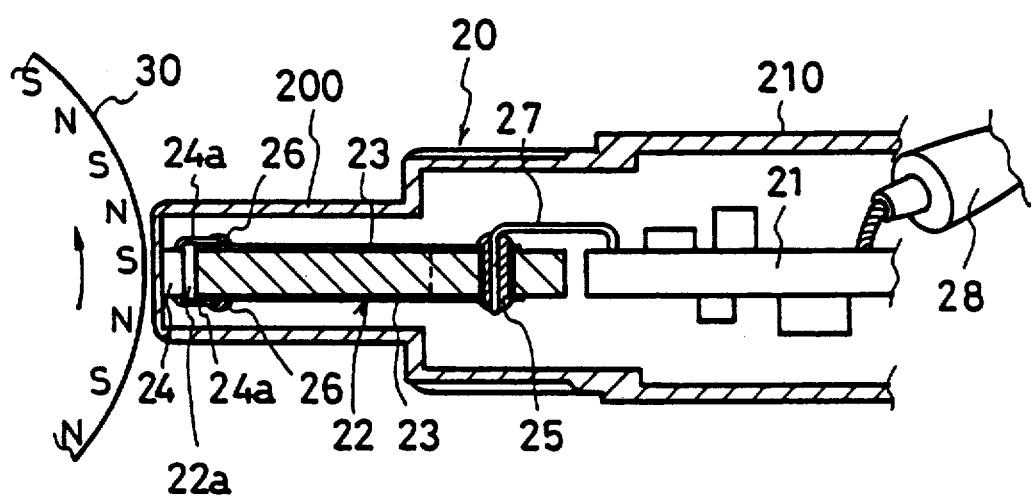
FIGS. 5 and 6 are sectional top and side views of a conventional magnetoelectronic transducer.
Figure 6:
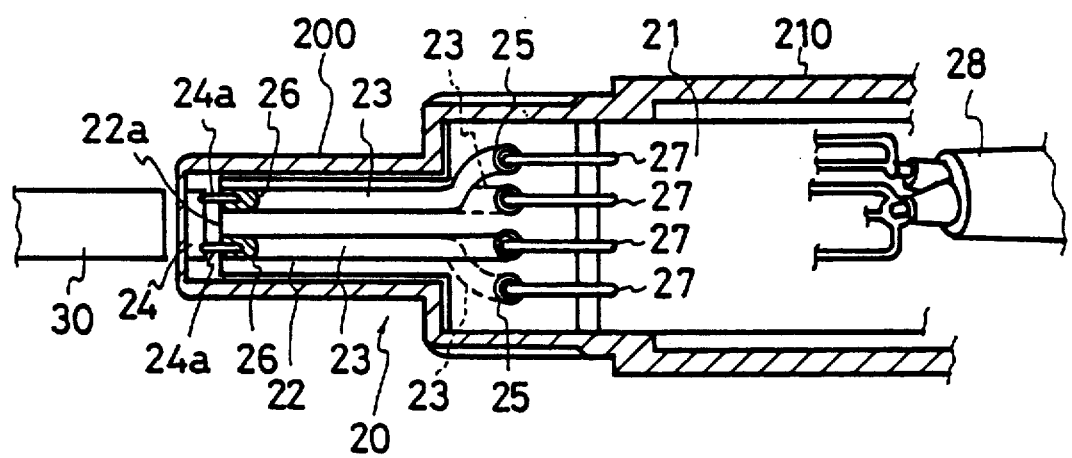
Figure 7:
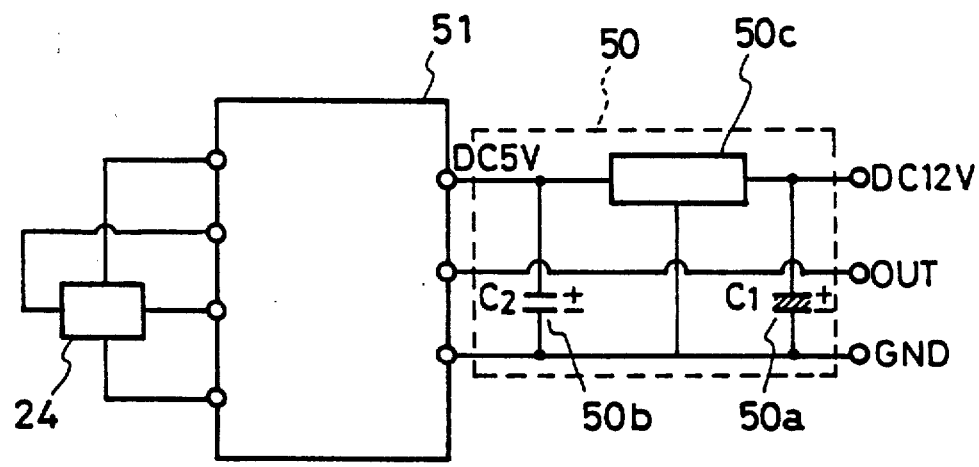
FIG. 7 is a circuit diagram of the conventional magnetoelectronic transducer.

FIGS. 1-4 show a magnetoelectronic transducer according to an embodiment of the invention, wherein like reference numerals denote like or corresponding parts of FIGS. 5-7, and their description will be omitted. A housing 20 has a rectangular circuit housing section 210 for housing a circuit board 21; an element housing section 200 which extends laterally from the circuit housing section 210 toward a sensing disk 30 and houses an element holder 22; and an extended section 220 extending downwardly from the circuit housing section 210 so that the element housing section 200 extends at right angles with the extended section 220.

The circuit housing section 210 has a circuit board 21 mounted on its floor 210a and a pair of projections 40 on opposite sides 210b. The extended section 220 has a hole 220a through which a bolt 31 is passed to attach the magnetoelectronic transducer. The basic section 22b of the element holder 22 has a plurality of through holes 25 and various conductors for electrically connecting these through holes. A large capacity capacitor 50a, an oscillation preventive capacitor 50b, and a three-terminal regulator 50c are connected to the through holes with solder 26 to form a power circuit 50 together with the leads 23. The cable 28 is connected to the first terminal 32a provided at the through hole 25 on the input side of the power circuit 50, while the second terminal 32b provided at the through hole 25 on the output side of the power circuit 50 and the third terminal 32c provided at the through hole 25 of the lead 23, which is connected to the Hall element 24, are connected to the circuit board 21 via a flexible printed circuit board 33.

A U-shaped protective cover 34, which is made by stamping and forming sheet metal, such as aluminum or iron, covers the circuit board 21 to shield electrical noise. Each side of protective cover 34 has a hook portion 34a at its free end for engagement with the projection 40 of the circuit housing section 210. Also, it has an elongated piece 35 to which the cable 28 is attached by the thermally shrink tube 36.

The 12-V d.c. power supplied via the cable 28 and the first terminal 32a is converted into 5 V d.c. and supplied to the processing circuit 51 on the circuit board 21 via the second terminal 32b and the flexible printed circuit board 33. A signal is transmitted from the Hall element 24 via the third terminal 32c and the flexible printed circuit board 33. That is, only the processing circuit 51 is mounted on the circuit board 21 so that not only the size of the circuit board 21 is reduced but also the heat generated by the power circuit 50 has little or no influence on the processing circuit 51. The cable 28 is connected to the first terminal 32a of the element holder 22 which is held in the element housing section 200 and secured to the elongated piece 35 of the protective cover 34 which is held in the circuit housing section 210 so that it withstands well against vibrations and loads. In addition, the protective cover 34 shields electrical noise so that the malfunction otherwise arising from the noise is prevented despite a weak signal from the Hall element 24.

Alternatively, the Hall element 24 may be replaced by any other type of magnetoelectronic transducer element such as a magnetic resistor. The flexible printed circuit board 33 may be replaced by a group of flexible conductors such as leads.

Since the power circuit is mounted on the base portion of the element holder to which the cable is connected and since the element holder is connected via flexible conductors to the separate circuit board on which the processing circuit is mounted, it is easy to design the circuit board in terms of the thermal characteristics and possible to reduce the size of a circuit board, thus providing a compact, reliable magnetoelectronic transducer.

I claim:

1. A magnetoelectronic transducer comprising:
   a housing;
   a circuit board provided within said housing and having a processing circuit for processing various signals;
   an element holder provided within said housing and having a basic section adjacent to and perpendicular to said circuit board and a front end portion extending from said basic section toward a rotary member to be detected;
   a magnetoelectronic transducer element attached to a front end of said element holder;
   a cable for carrying power and said various signals to and from said processing circuit; and
   a power circuit provided on said basic section of said element holder and connected directly to said cable and indirectly to said circuit board via a conductor.

2. The magnetoelectronic transducer of claim 1, wherein said housing comprises:
   a rectangular circuit housing section having at least one wall on an inner surface of which said circuit board is mounted; and
   a cylindrical element housing section projecting outwardly from an outer surface of said wall and housing said element holder such that said basic section of said element holder extends into said rectangular circuit housing section beyond said circuit board, thereby providing a compact, reliable magnetoelectronic transducer.

3. The magnetoelectronic transducer of claim 2, wherein said basic section of said element holder has said power circuit on one side and said cable connected to the other side.

4. The magnetoelectronic transducer of claim 2, which further comprises a protective cover which is provided over said circuit board and has an elongated piece to which said cable is secured.

5. The magnetoelectronic transducer of claim 2, wherein said circuit housing section has an extended section with a hole for receiving a bolt.

6. The magnetoelectronic transducer of claim 2, wherein said rotary member is a sensing disk having alternating n and s magnetic poles on its periphery.

* * * * *